United States Patent [19]

Marczinke et al.

[11] Patent Number: 5,451,639

[45] Date of Patent: Sep. 19, 1995

[54] PROPYLENE COPOLYMERS GRAFTED USING FREE RADICAL INITIATORS

[75] Inventors: Bernd L. Marczinke, Speyer; Juergen Kerth, Carlsberg; Patrik Mueller, Kaiserslautern; Horst Baumgartl, Mainz; Peter Ittemann, Lampertheim, all of Germany

[73] Assignee: BASF Aktiengesellschaft, Ludwigshafen, Germany

[21] Appl. No.: 208,845

[22] Filed: Mar. 11, 1994

[30] Foreign Application Priority Data

Mar. 18, 1993 [DE] Germany .......................... 43 08 587.3
Mar. 18, 1993 [DE] Germany .......................... 43 08 590.3
Mar. 18, 1993 [DE] Germany .......................... 43 08 588.1

[51] Int. Cl.⁶ .......................................... C08F 255/02
[52] U.S. Cl. ...................................... 525/193; 525/240
[58] Field of Search ................ 525/285, 301, 193, 240

[56] References Cited

U.S. PATENT DOCUMENTS 3,328,339  6/1967  Tierney et al. .
4,001,172  1/1977  Steinkamp et al. .
4,382,128  5/1983  Li .

OTHER PUBLICATIONS

*Chem. Abst.,* vol. 99, No. 22, P. 60, Nov. 1983.
DE 4 0 22 570–BASF OZ 005/41759 (copy attached).

*Primary Examiner*—Vasu S. Jagannathan
*Attorney, Agent, or Firm*—Keil & Weinkauf

[57] ABSTRACT

Propylene copolymers grafted with $\alpha,\beta$-ethylenically unsaturated carboxylic acids or carboxylic acid derivatives and consisting of a₁) a random propylene copolymer ($A_1$) containing from 0.1 to 15% by weight of polymerized $C_2$–$C_{10}$-alk-1-enes or of a₂) a propylene copolymer ($A_2$) comprising a random propylene copolymer (I) containing from 0.1 to 15% by weight of polymerized $C_2$–$C_{10}$-alk-1-enes and a random propylene copolymer (II) containing from 15 to 80% by weight of polymerized $C_2$–$C_{10}$-alk-1-enes or of a₃) a propylene copolymer ($A_3$) comprising a propylene homopolymer (III) and a random propylene copolymer (IV) containing from 15 to 80% by weight of polymerized $C_2$–$C_{10}$-alk-1-enes, are obtainable by reacting the monomer to be grafted with the propylene copolymer ($A_1$), ($A_2$) or ($A_3$) at from 1 to 300 bar, from 0.01 to 1.0% by weight of the monomer to be grafted, where both stated concentrations are based on the propylene copolymer, being added to the molten propylene copolymer in the presence of from 0.005 to 0.5% by weight of a free radical initiator and the grafting reaction being carried out at from 200° to 350° C.

2 Claims, No Drawings

PROPYLENE COPOLYMERS GRAFTED USING FREE RADICAL INITIATORS

The present invention relates to propylene copolymers grafted with $\alpha,\beta$-ethylenically unsaturated carboxylic acids or carboxylic acid derivatives and consisting of

- a$_1$) a random propylene copolymer (A$_1$) containing from 0.1 to 15% by weight of polymerized $C_2$–$C_{10}$-alk-1-enes or of
- a$_2$) a propylene copolymer (A$_2$) comprising a random propylene copolymer (I) containing from 0.1 to 15% by weight of polymerized $C_2$–$C_{10}$-alk-1-enes and a random propylene copolymer (II) containing from 15 to 80% by weight of polymerized $C_2$–$C_{10}$-alk-1-enes or of

- a$_3$) a propylene copolymer (A$_3$) comprising a propylene homopolymer (III) and a random propylene copolymer (IV) containing from 15 to 80% by weight of polymerized $C_2$–$C_{10}$-alk-1-enes, obtainable by reacting the monomer to be grafted with the propylene copolymer (A$_1$), (A$_2$) or (A$_3$) at from 1 to 300 bar, from 0.01 to 1.0% by weight of the monomer to be grafted, where both stated concentrations are based on the propylene copolymer, being added to the molten propylene copolymer in the presence of from 0.005 to 0.5% by weight of a free radical initiator and the grafting reaction being carried out at from 200° to 350° C.

The present invention furthermore relates to a process for the preparation of these grafted propylene copolymers and a process for the preparation of crosslinked or crosslinkable propylene copolymers and to the use of the grafted propylene copolymers as adhesion promoters, films, fibers or moldings.

Graft copolymers can be prepared by first reacting the polymer to be grafted with peroxides and then bringing the product into contact with suitable monomers (U.S. Pat. No. 3,862,265, U.S. Pat. No. 3,953,655 and U.S. Pat. No. 4,001,172). The treatment with the peroxides acting as initiators results initially in the formation of free radicals on the polymer chain, with which radicals monomers can undergo an addition reaction in the subsequent grafting reaction.

Processes in which homo- or copolymers of ethylene are first grafted with unsaturated carboxylic acids and/or esters or anhydrides thereof by a reaction initiated by organic peroxides and then reacted with polyfunctional amines or alcohols are also known (DE-A 2 627 785, EP-A 50 994, U.S. Pat. No. 4,089,794, U.S. Pat. No. 4,137,185, U.S. Pat. No. 4,161,452, U.S. Pat. No. 4,382,128). Crosslinked products which are very stable but, owing to their poor melt flow, cannot be processed thermally by the methods conventionally used in plastics technology are generally formed.

Processes for the preparation of grafted or crosslinked polypropylenes have also been described, but some of the processes have considerable deficiencies. For example, in grafting or crosslinking reactions, the use of peroxides generally leads to a decrease in the molecular weight, which causes the mechanical properties of the product obtainable to deteriorate to a substantial extent [J. Appl. Poly. Sci., 32 (1986), 5431–5437]. In another possible method of crosslinking polypropylenes, the latter are first grafted with vinylsilanes and then crosslinked by condensation with steam using an organic tin catalyst (DE-A 3 520 106, U.S. Pat. No. 3,328,339). However, this process is very expensive since the generally toxic tin catalysts can be removed from the product only with difficulty. Moreover, all silane groups required for adhesion of the polymer melt to polar substrates are hydrolyzed by water on cooling, making it virtually impossible to produce multilayer composites. French Patent 2,572,417 furthermore discloses a process in which polypropylene can be grafted by reaction with organic peroxides and unsaturated carboxylic anhydrides.

On the basis of the prior art, there are certain reservations about the use of free radical initiators, for example peroxides, in grafting reactions. For example, it is known that the use of high peroxide concentrations in the grafting of polypropylenes leads as a rule to a sharp decrease in molecular weight and to a reduction in the adhesion to polar substances, for example metals or polyamides, so that the resulting polymer does not have satisfactory performance characteristics.

DE-A 4 022 570 discloses the preparation of grafted propylene copolymers in the absence of free radical initiators. This process, which is easy to carry out, gives graft copolymers which have good mechanical properties and may furthermore be converted with crosslinking agents into crosslinked or crosslinkable materials.

However, the disadvantage of the process described in DE-A 40 22 570 is that the propylene copolymers obtained therefrom frequently do not exhibit very high grafting yields, which is important for certain applications. The grafting yield is understood as meaning the percentage of grafted monomers, based on the total amount of graft monomers used. The not very high grafting yields result in adhesive strengths and tensile strengths, relative to materials such as glass, polyamide or metals, which are unsatisfactory for certain applications.

It is an object of the present invention to remedy the disadvantages described and to provide grafted propylene copolymers which exhibit a high grafting yield and improved tensile strength.

We have found that this object is achieved by the propylene copolymers defined at the outset and grafted with ethylenically unsaturated carboxylic acids or carboxylic acid derivatives.

$\alpha,\beta$-unsaturated carboxylic acids or carboxylic acid derivatives are used as graft monomers in the process leading to the novel propylene copolymers. $\alpha,\beta$-unsaturated carboxylic acids or carboxylic acid derivatives are to be understood as meaning the conventional carboxylic acids copolymerizable with propylene, and the ester, anhydride or amide derivatives thereof. Maleic acid, fumaric acid, itaconic acid, acrylic acid, crotonic acid or anhydrides thereof are among the substances preferably used, maleic anhydride being particularly suitable.

In the process leading to the novel propylene copolymers, the monomer to be grafted is reacted with a propylene copolymer which consists of

- a$_1$) a random propylene copolymer (A$_1$) containing from 0.1 to 15% by weight of polymerized $C_2$–$C_{10}$-alk-1-enes or of

- a$_2$) a propylene copolymer (A$_2$) comprising
  a random propylene copolymer (I) containing from 0.1 to 15% by weight of polymerized $C_2$–$C_{10}$-alk-1-enes and
  a random propylene copolymer (II) containing from 15 to 80% by weight of polymerized $C_2$–$C_{10}$-alk-1-enes or of a3) a propylene copolymer (A3) comprising a propylene homopolymer (III) and a random propylene copolymer (IV) containing from 15 to 80% by weight of polymerized $C_2$–$C_{10}$-alk-1-enes.

If a random propylene copolymer (A1) is used as the propylene copolymer, preferred random propylene copolymers are those in which the content of comonomers is from 0.2 to 12, in particular from 0.3 to 9, % by weight. In particular, ethylene, but-1-ene, pent-1-ene, hex-1-ene, hept-1-ene or oct-1-ene is used as $C_2$–$C_{10}$-alk-1-ene, and, in the preparation of these copolymers, the $C_2$–$C_{10}$-alk-1-enes may be copolymerized either individually or as mixtures together with the propylene.

The novel grafted propylene copolymers may also contain the propylene copolymer (A2). A propylene copolymer (A2) which comprises a random propylene copolymer (I) containing from 0.2 to 12, in particular from 0.3 to 9, % by weight of polymerized $C_2$–$C_{10}$-alk-1-enes and a random propylene copolymer (II) containing from 20 to 75, in particular from 25 to 70, % by weight of polymerized $C_2$–$C_{10}$-alk-1-enes is preferably used. In particular, ethylene, but-1-ene, pent-1-ene, hex-1-ene, hept-1-ene or oct-1-ene is used as the $C_2$–$C_{10}$-alk-1-ene, and, in the preparation of these copolymers, the $C_2$–$C_{10}$-alk-1-enes may be copolymerized either individually or as mixtures together with the propylene.

A preferably used propylene copolymer (A2) is one which comprises from 25 to 97% by weight of the random propylene copolymer (I) and from 3 to 75% by weight of the random propylene copolymer (II). Particularly preferred propylene copolymers (A2) contain from 35 to 95, in particular from 40 to 93, % by weight of the random propylene copolymer (I) and from 5 to 65, in particular from 7 to 60, % by weight of the random propylene copolymer (II).

The novel grafted propylene copolymers may furthermore contain the propylene copolymer (A3).

A preferably used propylene copolymer (A3) is one whose random propylene copolymer (IV) contains from 20 to 75, in particular from 25 to 70, % by weight of polymerized $C_2$–$C_{10}$-alk-1-enes. In particular, ethylene, but-1-ene, pent-1-ene, hex-1-ene, hept-1-ene or oct-1-ene is used as the $C_2$–$C_{10}$-alk-1-ene, and, in the preparation of these copolymers, the $C_2$–$C_{10}$-alk-1-enes may be copolymerized either individually or as mixtures together with the propylene.

A preferably used propylene copolymer (A3) is one which consists of from 25 to 97% by weight of the propylene homopolymer (III) and of from 3 to 75% by weight of the random propylene copolymer (IV). Particularly preferred propylene copolymers (A3) contain from 30 to 95, in particular from 35 to 90, % by weight of the propylene homopolymer (III) and from 5 to 70, in particular from 10 to 65, % by weight of the random propylene copolymer (IV).

These propylene copolymers (A1), (A2) or (A3) are usually prepared by polymerization with the aid of Ziegler-Natta catalysts. These contain, inter alia, a titanium-containing solid component as well as a cocatalyst. A suitable cocatalyst is an aluminum compound. In addition to this aluminum compound, an electron donor compound is preferably used as a further component of the cocatalyst. The polymerization is carried out in the reactors usually used in industry for polymerization reactions, preferably in the gas phase.

For the preparation of the titanium-containing solid component, the titanium compounds used are in general halides or alcoholates of trivalent or tetravalent titanium, the chlorides of titanium, in particular titanium tetrachloride, being preferred. Advantageously, the titanium-containing solid component contains a finely divided carrier, silicas and aluminas as well as aluminum silicates of the empirical formula $SiO_2 \cdot aAl_2O_3$, where a is from 0.001 to 2, in particular from 0.01 to 0.5, having proven useful for this purpose.

Compounds of magnesium are also among the substances used in the preparation of the titanium-containing solid component. Particularly suitable compounds of this type are magnesium halides, alkylmagnesiums and arylmagnesiums, as well as alkoxymagnesium and aryloxymagnesium compounds, magnesium chloride, magnesium bromide and di-$C_1$–$C_{10}$-alkylmagnesium compounds being preferably used. The titanium-containing solid component may also contain halogen, preferably chlorine or bromine.

The titanium-containing solid component furthermore contains electron donor compounds, for example monofunctional or polyfunctional carboxylic acids, carboxylic anhydrides and carboxylates, and ketones, ethers, alcohols, lactones and organophosphorus and organosilicon compounds. Preferably used electron donor compounds in the titanium-containing solid component are phthalic acid derivatives of the general formula I

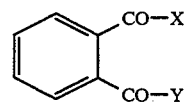

where X and Y are each chlorine or $C_1$–$C_{10}$-alkoxy or together are oxygen. Particularly preferred electron donor compounds are phthalates where X and Y are each $C_1$–$C_8$-alkoxy, for example methoxy, ethoxy, propoxy or butoxy.

Further preferred electron donor compounds in the titanium-containing solid component include diesters of 3-membered or 4-membered, unsubstituted or substituted cycloalkane-1,2-dicarboxylic acids and monoesters of unsubstituted or substituted benzophenone-2-carboxylic acids. The hydroxy compounds used in these esters are the alcohols conventionally used in esterification reactions, including $C_1$–$C_{15}$-alkanols, $C_5$–$C_7$-cycloalkanols, which in turn may carry $C_1$–$C_{10}$-alkyl groups, and $C_6$–$C_{10}$-phenols.

The titanium-containing solid component may be prepared by methods known per se. Examples of these are described in, inter alia, EP-A 45 975, EP-A 45 977, EP-A 86 473, EP-A 171 200, GB-A 2 111 066 and U.S. Pat. No. 4,857,613.

The titanium-containing solid component obtainable in this manner is used with cocatalysts as a Ziegler-Natta catalyst system. Suitable cocatalysts are aluminum compounds and further electron donor compounds.

Aluminum compounds suitable as a cocatalyst are trialkylaluminum as well as those compounds in which one alkyl group is replaced by an alkoxy group or by a halogen atom, for example by chlorine or bromine. Trialkylaluminum compounds whose alkyl groups are each of 1 to 8 carbon atoms, for example trimethyl-, triethyl- or methyldiethylaluminum, are preferably used.

In addition to the aluminum compound, electron donor compounds, for example mono- or polyfunctional carboxylic acids, carboxylic anhydrides and carboxylates, or ketones, ethers, alcohols, lactones and organophosphorus and organosilicon compounds, are also preferably used as further cocatalyst. Preferred electron donor compounds are organosilicon compounds of the general formula II $$R^1{}_n Si(OR^2)_{4-n} \qquad \text{II.}$$

where
the radicals $R^1$ are identical or different and are each $C_1$–$C_{20}$-alkyl, a 5-membered to 7-membered cycloalkyl group which in turn may carry a $C_1$–$C_{10}$-alkyl group, or $C_6$–$C_{20}$-aryl or arylalkyl, the radicals $R^2$ are identical or different and are each $C_1$–$C_{20}$-alkyl and n is 1, 2 or 3. Particularly preferred compounds are those in which $R^1$ is $C_1$–$C_8$-alkyl or a 5-membered to 7-membered cycloalkyl group, $R^2$ is $C_1$–$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane, diethoxyisobutylisopropylsilane and dimethoxyisopropyl-sec-butylsilane are particularly noteworthy.

Preferably used catalyst systems are those in which the atomic ratio of aluminum from the aluminum compound to titanium from the titanium-containing solid component is from 10:1 to 800:1, in particular from 20:1 to 200:1, and the molar ratio of the aluminum compound to the electron donor compound used as the cocatalyst is from 1:1 to 100:1, in particular from 2:1 to 80:1. The individual catalyst components may be introduced into the polymerization system in any order, individually or as a mixture of two components.

With the aid of such catalyst systems, it is possible to prepare the propylene copolymers ($A_1$), ($A_2$) or ($A_3$) required for the preparation of the novel, grafted polymers.

The random propylene copolymers ($A_1$) are preferably prepared by polymerization of the propylene and of the $C_2$–$C_{10}$-alk-1-enes used as comonomers in a reactor in the absence of a liquid reaction medium at from 20 to 40, in particular from 25 to 35, bar, at from 60° to 90° C., in particular from 65° to 85° C. and during an average residence time of the polymer of from 0.5 to 5 hours. A process where the ratio of the partial pressure of propylene to that of the $C_2$–$C_{10}$-alk-1-enes is brought to 5:1–100:1, in particular 5:1–50:1, is preferred. The reactors used may be the apparatuses conventionally employed in polymerization technology. The molecular weight of the propylene copolymers ($A_1$) can be regulated by conventional regulators, for example hydrogen.

The propylene copolymers ($A_2$) are obtainable, inter alia, by first preparing the random propylene copolymer (I) in a first polymerization stage and then adding to it the random propylene copolymer (II). This may be effected, for example, in a two-stage reactor cascade. The order of the preparation of the individual propylene copolymers (I) and (II) may also be reversed.

The polymerization in the first polymerization stage is preferably carried out at from 20 to 40, in particular from 25 to 35, bar, at from 60° to 90° C., in particular from 65° to 85° C. and during an average residence time of the reaction mixture of from 0.5 to 5, in particular from 1.0 to 4, hours. Usually, the reaction conditions are chosen so that, in the first polymerization stage, from 0.05 to 2 kg, preferably from 0.1 to 1.5 kg, of the propylene copolymer (I) is/are formed per mmol of the aluminum component. It is advisable to bring the ratio of the partial pressure of propylene to that of the $C_2$–$C_{10}$-alk-1-ene to about 5:1–500:1, in particular 10:1–200:1. The polymerization may be carried out in the presence of regulators, for example of hydrogen.

The propylene copolymer (I) obtainable in this manner is discharged together with the catalyst from the first polymerization stage after the end of the reaction and is introduced into the second polymerization stage, where the propylene copolymer (II) is formed by polymerization with a mixture of propylene and further $C_2$–$C_{10}$-alk-1-enes.

In the second polymerization stage, the polymerization is preferably effected at from 5 to 30, in particular from 10 to 25, bar, at from 30° to 80° C., in particular from 40° to 70° C., and during an average residence time of from 0.5 to 5, in particular from 1.0 to 4, hours. In this case, the ratio of the partial pressure of propylene to that of the $C_2$–$C_{10}$-alk-1-ene is from about 0.1:1 to 20:1, in particular from 0.15:1 to 15:1. The weight ratio of the monomers reacted in the first polymerization stage to that of the monomers reacted in the second polymerization stage is from about 33:1 to 1:3, in particular from 19:1 to 1:2.

It may also be advisable to add a $C_1$–$C_8$-alkanol, in particular a $C_1$–$C_4$-alkanol, to the reaction mixture of the second polymerization stage, said alkanol influencing the activity of the Ziegler-Natta catalyst. Alkanols suitable for this purpose include methanol, ethanol, n-propanol, n-butanol and very particularly isopropanol. The amount of the $C_1$–$C_8$-alkanol is advantageously such that the molar ratio of the $C_1$–$C_8$-alkanol to the aluminum compound serving as a cocatalyst is from 0.01:1 to 10:1, in particular from 0.02:1 to 5:1.

The molecular weight of the propylene copolymers (II) obtainable can be regulated in the conventional manner by adding regulators, in particular hydrogen. Inert gases, such as nitrogen or argon, may also be present.

The propylene copolymer ($A_2$) to be used according to the invention and consisting of the random propylene copolymer (I) and the random propylene copolymer (II) is obtained in this manner.

The propylene copolymers ($A_3$) can advantageously be prepared by a two-stage process in which propylene is polymerized in a first polymerization stage to give the propylene homopolymer (III), with which the propylene copolymer (IV) is then mixed in a second polymerization stage by polymerization of a mixture of propylene and one or more $C_2$–$C_{10}$-alk-1-enes.

The polymerization of the propylene in the first polymerization stage is usually carried out at from 20 to 40, preferably from 20 to 35, bar, and from 60° to 90° C., preferably from 65° to 85° C., and during an average residence time of the reaction mixture of from 0.5 to 5, preferably from 1.0 to 4, hours. The reaction conditions are usually chosen so that, in the first polymerization stage, from 0.05 to 2 kg, preferably from 0.1 to 1.5 kg, of the propylene homopolymer (III) are formed per mmol of the aluminum component.

The propylene homopolymer (III) obtained is discharged with the catalyst from the first polymerization stage after the end of the reaction and is introduced into the second polymerization stage, where a mixture of propylene and one or more $C_2$–$C_{10}$-alk-1-enes, in particular ethylene or but-1-ene, is polymerized with it. The pressure prevailing in the second polymerization stage is 7, preferably 10, bar below that of the first polymerization stage and is from 5 to 30, preferably from 10 to 25, bar. The temperature is from 30° to 100° C., preferably from 35° to 80° C., and the average residence time of the polymer is from 0.5 to 5, preferably from 1.5 to 4, hours.

In the second polymerization stage, the ratio of the partial pressure of propylene to that of the $C_2$-$C_{10}$-alk-1-ene or $C_2$-$C_{10}$-alk-1-enes is usually from 0.1:1 to 10:1, in particular from 0.5:1 to 8:1. The weight ratio of the monomers reacted in the first polymerization stage to the monomers reacted in the second polymerization stage is preferably from 0.1:1 to 20:1, in particular from 0.2:1 to 15:1.

The novel, grafted propylene copolymers are preferably prepared by a process in which from 0.01 to 1.0% by weight, based on the propylene copolymer, of the monomer to be grafted is mixed with the molten propylene copolymer ($A_1$), ($A_2$) or ($A_3$) at from 1 to 300, preferably from 1 to 250, bar in the presence of a free radical initiator, and the grafting reaction is carried out at from 200° to 350° C. The monomer to be grafted is preferably used in concentrations of from 0.01 to 0.8, in particular from 0.01 to 0.5, % by weight, based in each case on the propylene copolymer. The grafting reaction can advantageously be carried out at from 210° to 290° C., in particular from 210° to 280° C., and during residence times of from 0.5 to 10, in particular from 0.5 to 5, minutes.

The grafting reaction is effected in the presence of from 0.005 to 0.5, preferably from 0.01 to 0.2, in particular from 0.01 to 0.1, % by weight, based on the propylene copolymer ($A_1$), ($A_2$) or ($A_3$), of a free radical initiator.

The free radical initiators usually used are organic azo compounds or organic peroxides, the latter preferably being used. Particularly preferred organic peroxide compounds have half lives at 210° C. of from 1 to 30 seconds. Among these compounds, dicumyl peroxide, monocumyl tert-butyl peroxide, di-tert-butyl peroxide, 2,5-dimethyl-2,5-di-(tert-butylperoxy)-hexane and 2,5-dimethyl-2,5-di-(tert-butylperoxy)-hex-3-yne are particularly noteworthy.

The reactors usually used in plastics technology, for example extruders or Brabender mixers, may be employed for the grafting of the propylene copolymers ($A_1$), ($A_2$) or ($A_3$) in the presence of the free radical initiator. Twin-screw extruders are particularly suitable. In a preferred embodiment, the propylene copolymer is metered together with the monomer to be grafted and the free radical initiator into the feed of the twin-screw extruder, where the mixture is first melted at from about 120° to 180° C. and grafting is then effected at from 200° to 350° C. for from 0.5 to 5 minutes. The monomer to be grafted is preferably added in the liquid state, said monomer being heated beforehand. The monomer to be grafted may also be introduced into the extruder after the melting of the propylene copolymer. The free radical initiator is usually added either as such or as a solution in an inert hydrocarbon. Advantageously, traces of unconverted monomers to be grafted are removed after the end of the grafting reaction, in two devolatilization zones downstream of the feed zone of the extruder.

The grafted propylene copolymers obtainable in this manner usually contain from 0.01 to 1% by weight of the monomer to be grafted. They have good performance characteristics, in particular high adhesive strength and tensile strength relative to polar substances, for example to metals or polyamides. Moreover, they exhibit an improved grafting yield. They are colorless and odorless and have only low residual monomer contents. Their melt flow indices are from 0.1 to 100, preferably from 1.0 to 50, g/10 min, measured in each case according to DIN 53 735 at 230° C. and 2.16 kg. The melt flow index corresponds to the amount of polymer which is forced, in the course of 10 minutes at 230° C. and under a weight of 2.16 kg, out of the test apparatus standardized according to DIN 53 735.

The novel, grafted propylene copolymers are suitable, inter alia, as adhesion promoters, films, fibers and moldings. They may also be reacted with organic crosslinking agents, for example diamines, to give crosslinked or crosslinkable propylene copolymers.

EXAMPLES

Examples 1 to 6 and Comparative Examples A to F were carried out in a ZSK 40 twin-screw extruder from Werner & Pfleiderer. The propylene copolymers used were introduced into the twin-screw extruder in the form of coarse particles or granules and were melted there at 180° C. The polymer throughput in the extruder was 20 kg/h and the average residence time was 2 minutes.

Example 1

100 parts by weight of a propylene/ethylene copolymer ($A_2$), consisting of 55.2% by weight of a random ethylene/propylene copolymer (determined by extraction fractionation according to W. Holtrup, Makromol. Chem. 178 (1977), 2335) containing 2.5% by weight of polymerized ethylene (determined by Fourier transform spectroscopy) and 44.8% by weight of a propylene/ethylene copolymer having an ethylene content of 60% by weight and a melt flow index of 1.0 g/10 min (at 230° C. and 2.16 kg, according to DIN 53 735) were melted at 180° C. in a ZSK 40twin-screw extruder together with 0.02 part by weight of 2,5-dimethyl-2,5-di-(tert-butylperoxy)-hexane, 0.25 part by weight of liquid maleic anhydride was added and the mixture was reacted at 260° C. The pressure was 12 bar. After the end of the reaction, unconverted maleic anhydride was removed from the polymer melt via a devolatilization zone, and the product was then cooled in a water bath, granulated and dried. The content of grafted maleic anydride, the grafting yield (content of grafted maleic anhydride based on the total amount of maleic anhydride used) and the melt flow index of the examples and of the comparative examples are shown in the table below. The table also shows the tensile strength of a glass fiber-reinforced propylene homopolymer to which 4% by weight of the propylene copolymer grafted with maleic anhydride have been added.

Comparative Example A 100 parts by weight of the propylene/ethylene copolymer used in Example 1 were grafted with 0.25 part by weight of maleic anhydride under the conditions of Example 1 but without the addition of peroxide.

Example 2

Under the conditions of Example 1, 100 parts by weight of a propylene/ethylene copolymer ($A_2$), consisting of 53.5% by weight of a random ethylene/propylene copolymer (determined by extraction fractionation according to W. Holtrup, Makromol. Chem. 178 (1977), 2335) containing 2.5% by weight of polymerized ethylene (determined by Fourier transform spectroscopy) and 44.8% by weight of a propylene/ethylene copolymer having an ethylene content of 32% by weight and a melt flow index of 1.0 g/10 min (at 230° C. and 2.16 kg, according to DIN 53 735) were melted together with 0.03 part by weight of 2,5-dimethyl-2,5-di-(tert-butylperoxy)-hexane at 180° C. in a ZSK 40 twin-screw extruder, 0.35 part by weight of liquid maleic anhydride was added and the mixture was reacted at 260° C.

Comparative Example B 100 parts by weight of the propylene/ethylene copolymer used in Example 1 were grafted with 0.35 part by weight of maleic anhydride under the conditions of Example 1 but without the addition of peroxide.

TABLE

|  | Examples | | Comparative Examples | |
|---|---|---|---|---|
|  | 1 | 2 | A | B |
| Content of grafted maleic anhydride (parts by weight per 100 parts by weight of propylene copolymer) | 0.23 | 0.30 | 0.19 | 0.25 |
| Grafting yield (%) | 92 | 86 | 76 | 71 |
| Melt flow index* (230° C./2.16 kg) | 3.8 | 2.2 | 4.5 | 2.4 |
| Tensile strength** (MPa) | 74 | 76 | 68 | 70 |

*according to DIN 53 735
**according to DIN EN 61:
Matrix:
  96% by weight of  homopolypropylene,
  4% by weight of   polypropylene grafted with maleic anhydride
Filler:
  30% by weight of  glass fibers Example 3

100 parts by weight of a propylene/ethylene copolymer ($A_1$) having a melt flow index of 2 g/10 min (230° C., 2.16 kg, according to DIN 53 735) and containing 2.5% by weight of polymerized ethylene (determined by Fourier transform spectroscopy) were melted together with 0.02 part by weight of 2,5-dimethyl-2,5-di-(tert-butylperoxy)-hexane at 180° C. in a ZSK 40 twin-screw extruder, 0.25 part by weight of liquid maleic anhydride was added and the mixture was reacted at 260° C. The pressure was 12 bar. After the end of the reaction, unconverted maleic anhydride was removed from the polymer melt via a devolatilization zone, and the product was then cooled in a water bath, granulated and dried.

The content of grafted maleic anhydride, the grafting yield (content of grafted maleic anhydride, based on the total amount of maleic anhydride used) and the melt flow index of the examples and of the comparative examples are shown in the table below. The table also shows the tensile strength of a glass fiber-reinforced homopolypropylene to which 4% by weight of the propylene copolymer grafted with maleic anhydride have been added.

Comparative Example C 100 parts by weight of the propylene/ethylene copolymer ($A_1$) used in Example 3 were grafted with 0.25 part by weight of maleic anhydride under the conditions of Example 3 but without the addition of peroxide.

Example 4

Under the conditions of Example 3, 100 parts by weight of the propylene/ethylene copolymer ($A_1$) used in Example 3 were melted with 0.025 part by weight of 2,5-dimethyl-2,5-di-(tert-butylperoxy)-hexane at 180° C. and reacted with 0.30 part by weight of liquid maleic anhydride.

Comparative Example D 100 parts by weight of the propylene/ethylene copolymer ($A_1$) used in Example 3 were grafted with 0.30 part by weight of maleic anhydride under the conditions of Example 3 but without the addition of peroxide.

TABLE

|  | Examples | | Comparative Examples | |
|---|---|---|---|---|
|  | 3 | 4 | C | D |
| Content of grafted maleic anhydride (parts by weight per 100 parts by weight of propylene copolymer) | 0.19 | 0.22 | 0.12 | 0.13 |
| Grafting yield (%) | 76 | 73 | 48 | 43 |
| Melt flow index* (230° C./2.16 kg) | 5.5 | 6.2 | 3.8 | 3.6 |
| Tensile strength** (MPa) | 72 | 73 | 65 | 65 |

*according to DIN 53 735
**according to DIN EN 61:
Matrix:
  96% by weight of  homopolypropylene,
  4% by weight of   polypropylene grafted with maleic anhydride
Filler:
  30% by weight of  glass fibers Example 5

100 parts by weight of a propylene/ethylene copolymer ($A_3$), consisting of 55.2% by weight of a propylene homopolymer (determined by extraction fractionation according to W. Holtrup, Makromol. Chem. 178 (1977), 2335) and 44.8% by weight of a propylene/ethylene copolymer having an ethylene content of 50% by weight and a melt flow index of 2.1 g/10 min (at 230° C. and 2.16 kg, according to DIN 53 735) were melted together with 0.02 part by weight of 2,5-dimethyl-2,5-di-(tert-butylperoxy)-hexane at 180° C. in a ZSK 40 twin-screw extruder, 0.25 part by weight of liquid maleic anhydride was added and the mixture was reacted at 260° C. The pressure was 12 bar. After the end of the reaction, unconverted maleic anhydride was removed from the polymer melt via a devolatilization zone, and the product was then cooled in a water bath, granulated and dried. The content of grafted maleic anhydride, the grafting yield (content of grafted maleic anhydride based on the total amount of maleic anhydride used) and the melt flow index of the examples and of the comparative examples are shown in the table below. The table also shows the tensile strength of a glass fiber-reinforced propylene homopolymer to which 4% by weight of the propylene copolymer grafted with maleic anhydride have been added.

Comparative Example E 100 parts by weight of the propylene/ethylene copolymer used in Example 5 were grafted with 0.25 part by weight of maleic anhydride under the conditions of Example 5 but without the addition of peroxide.

Example 6

Under the conditions of Example 5, 100 parts by weight of a propylene/ethylene copolymer, consisting of 55.2% by weight of a propylene homopolymer (determined by extraction fractionation according to W. Holtrup, Makromol. Chem. 178 (1977), 2335) and 44.8% by weight of a propylene/ethylene copolymer having an ethylene content of 50% by weight (determined by Fourier transform spectroscopy) and a melt flow index of 1.0 g/10 min (at 230° C. and 2.16 kg, according to DIN 53 735), were melted together with 0.03 part by weight of 2,5-dimethyl-2,5-di-(tert-butyl-peroxy)-hexane at 180° C. in a ZSK 40 twin-screw extruder, 0.35 part by weight of liquid maleic anhydride was added and the mixture was reacted at 260° C.

Comparative Example F 100 parts by weight of the propylene/ethylene copolymer used in Example 5 were grafted with 0.35 part by weight of maleic anhydride under the conditions of Example 5 but without the addition of peroxide.

TABLE

|  | Examples | | Comparative Examples | |
|---|---|---|---|---|
|  | 5 | 6 | E | F |
| Content of grafted maleic anhydride (parts by weight per 100 parts by weight of propylene copolymer) | 0.22 | 0.29 | 0.18 | 0.21 |
| Grafting yield (%) | 86 | 83 | 72 | 60 |
| Melt flow index* (230° C./2.16 kg) | 5.8 | 6.2 | 3.9 | 3.8 |
| Tensile strength** (MPa) | 73 | 75 | 67 | 68 |

*according to DIN 53 735
**according to DIN EN 61:
Matrix:
96% by weight of homopolypropylene,
4% by weight of polypropylene grafted with maleic anhydride
Filler:
30% by weight of glass fibers The novel propylene copolymers grafted with free radical initiators exhibit in particular an increased grafting yield and a high tensile strength.

We claim:

1. A propylene copolymer grafted with $\alpha,\beta$-ethylenically unsaturated carboxylic acids or carboxylic acid derivatives and consisting of
   a$_2$) a propylene copolymer (A$_2$) comprising a random propylene copolymer (I) containing from 0.1 to 15% by weight of polymerized $C_2$–$C_{10}$-1-alkenes and a random propylene copolymer (II) containing from 15 to 80% by weight of polymerized $C_2$–$C_{10}$-1-alkenes obtained by reacting the monomer to be grafted with the propylene copolymer (A$_2$) at from 1 to 300 bar, from 0.01 to 0.35% by weight of the monomer to be grafted, where both stated concentrations are based on the propylene copolymer, being added to the molten propylene copolymer in the presence of from 0.005 to 0.5% by weight of a free radical initiator and the grafting reaction being carried out at from 200° to 350° C.

2. A grafted propylene copolymer as defined in claim 1, wherein the propylene copolymer (A$_2$) consists of from 25 to 97% by weight of the random propylene copolymer (I) and from 3 to 75% by weight of the random propylene copolymer (II).

* * * * *